June 26, 1951 — C. B. IVES — 2,558,652
STABILIZED PRESSURE-OPERATED VALVE
Filed March 8, 1945
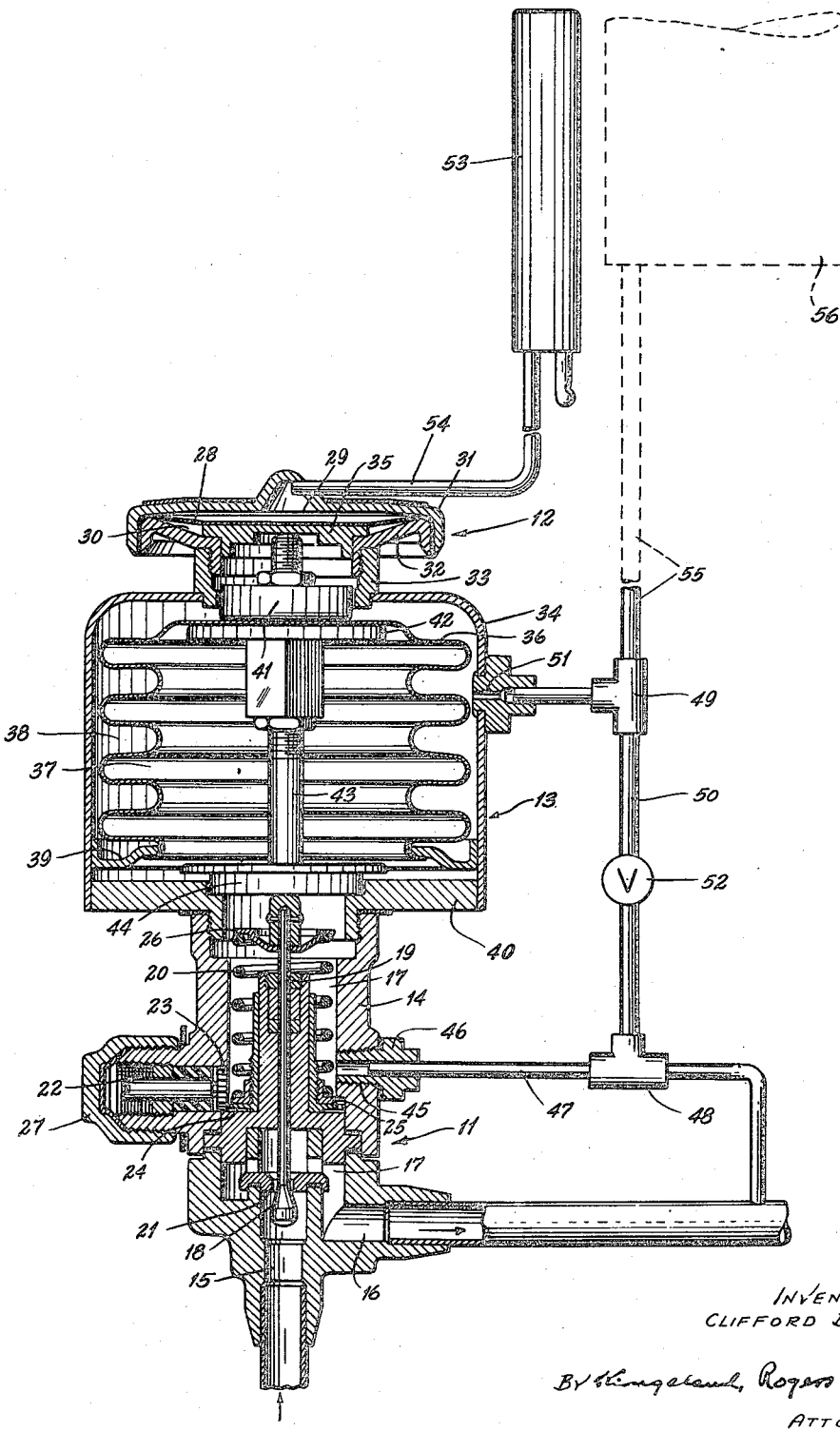
INVENTOR:
CLIFFORD B. IVES,
BY Kingsland, Rogers & Ezell
ATTORNEYS Patented June 26, 1951

2,558,652

UNITED STATES PATENT OFFICE 2,558,652

STABILIZED PRESSURE-OPERATED VALVE

Clifford B. Ives, Tenafly, N. J., assignor to Alco Valve Company, University City, Mo., a corporation of Missouri Application March 8, 1945, Serial No. 581,651

2 Claims. (Cl. 137—153)

This invention pertains to thermo valves generally, and concerns itself primarily with a stabilized thermo valve.

Thermally controlled valves, or thermo valves, are used in installations where a pressure is to be maintained as a function of a temperature. Thus, a thermo bulb will be arranged to control a power means which will, in turn, open or close a valve. If the apparatus is such that a decrease in temperature is to result from an increase in pressure of a given medium, then an increase in temperature at the thermo bulb will cause a power means to open the valve and increase the pressure of the medium in the system to a point where a temperature drop will result and a closing cycle will be instituted. Considering all of the steps involved, it will be apparent that such apparatus is subject to excessive cycling or hunting due to the adverse time lags between the moment a change in the temperature at the thermo bulb is felt, a corrective action made, and the results transmitted to the bulb. Particularly is this true in refrigeration and air conditioning installations, and it is frequently necessary to change the adjusting springs of the present art valves employed to ones having higher deflecting rates as a corrective measure for such excessive cycling. This is done, however, at a great sacrifice in the sensitivity of the control effected, and results in a control which will vary over considerably wider ranges when the valve is exposed to varying load conditions.

As its general aim, the present invention contemplates the provision of a stabilized thermo valve capable of effecting a highly sensitive regulation without excessive cycling.

In other terms, it is intended to provide a stabilized thermo valve capable of maintaining an effective high degree of sensitivity, yet giving a low sensitivity for temporary periods during which the valve is operative to effect a full corrective action in the system in which it is employed.

More specifically, it is a purpose of this invention to provide a thermo valve having a stabilizer interposed between a thermally controlled power element and a valve, the stabilizer being operative to add a counterforce to that of the power element and a delayed additive force thereto, both of which are functions of the pressure maintained at the downstream side of the valve.

Other objects and advantages of the invention will become apparent as the description proceeds.

In carrying out the invention in its preferred form, a stabilizer is interposed between a valve mechanism and a thermally operated power element used to open and close the valve. The stabilizer is, essentially, two pressure-responsive elements arranged to apply forces to the valve opening and closing member of the power element and responsive to a pressure maintained at the downstream side of the valve. These pressure-responsive devices are so arranged as to develop equal forces, one of which is additive to that of the power element and the other of which is subtractive. A restricting element is connected in the line supplying the pressure chamber of the responsive device which adds a force to that of the power element, and, in effect, delays for a period of time the condition at which both of the forces produced by the stabilizer reach a point of equilibrium. In a sense, the action of the stabilizer gives to the valve a low sensitivity during the time the valve is operated to produce a corrective action and renders the valve highly sensitive immediately upon the condition in which the two forces of the stabilizer are equalized.

A more comprehensive understanding of the invention will be afforded from the following detailed description when considered in conjunction with the accompanying drawing in which the figure is a vertical section of a stabilized thermo valve illustrating the invention in a preferred form.

As illustrated in the drawing, the invention contemplates a valve device 11 which is controlled by a thermally operated power element 12 and stabilized by a stabilizer 13 interposed between the power element and the valve. The valve device 11 comprises a valve body 14 having an inlet opening 15 and an outlet opening 16 communicating with a valve cavity or stack 17 in the valve body. Operating within the stack 17 is the conventional valve cage comprising a valve member 18, a stem 19, and a valve spring 20, which, together with its associated elements, forces the valve 18 against its seat 21. The valve 18 occupies a normally closed position against its seat 21 under the action of the valve spring 20. The latter element is adjustable in tension by means of a screw 22 having attached to one end thereof a pinion 23 engageable with a flanged portion of a sleeve 24. Rotation of the screw 23 turns the sleeve 24 within a threaded collar 25 which is held against rotation, causing it to move upwardly and compress the spring 20 between the flanged portion of the sleeve 24 and an upper collar 26. A sealed cap 27 covers the valve opening in which the adjusting screw 22 is carried.

The power element 12 may take any conventional form. As illustrated, it comprises a diaphragm 28 which is movable in a first pressure chamber 29 and a second pressure chamber 30 formed by an upper diaphragm plate 31 and a lower plate 32. The latter element is threaded to a collar 33 which is attached to a casing 34 on the stabilizer 13. Within the chamber 30 is a buffer plate 35 which is held against the diaphragm 28 by the valve spring 20.

The stabilizer 13, which is interposed between the valve device and its power element 12, is made up essentially of the casing 34 and a bellows 36. The bellows 36 is contained within the casing 34 in a manner such that a pressure chamber 37 within the bellows is sealed from a pressure chamber 38 enveloping the outside of the bellows. This seal is effected by soldering the bellows to a member 39 which is welded to the casing 34. The entire power element and stabilizer assembly is mounted on the valve by welding the casing 34 onto a coupling 40 which is screwed to the valve body 14.

The forces acting in the chamber 29 of the power element 12 are transmitted by the buffer plates 34, 41, and 42 to a stem 43 attached to a lower buffer plate 44. The latter element acts as a stop as protection against pressure overrange, and is provided with means connecting the pressure chamber 37 and the valve stack 17 of the valve body 11, which latter member is tapped at 45 for a connection 46. A connecting line 47 is communicable with the valve stack 17, and, through the connections 48 and 49 and a line 50, transmits the pressure medium appearing on the downstream side of the valve to the pressure chamber 38 through an opening 51. A restricting device 52, such as a needle valve or capillary, is connected in the line 50 and provides a time delay device for delaying a pressure change in the chamber 38 equal to that in the chamber 37.

The power element 12 is controlled by a thermo bulb 53 which is connected with the pressure chamber 29 thereof by a capillary tube 54. Also, the control side of the valve may be connected by a line 55 to a capacity tank 56, which in some applications may be necessary to supply additional capacity on the reset side of the time lag device 52 so as to render its setting less critical.

The operation of the valve can best be described by tracing its steps through a complete cycle in terms of hypothetic pressure values. Assuming the valve to be connected in a system as illustrated and to be in a state of equilibrium under conditions such that the thermo bulb 53 is exerting a pressure of twenty pounds per square inch to open the valve 18, and assuming, further, that the valve spring 20 is adjusted to exert a pressure of ten pounds per square inch upwardly to close the valve, then, under the conditions of equilibrium, ten pounds per square inch will be effective on the downstream side of the valve which will be operating against the top of the bellows 36 and under the diaphragm 28 to maintain a condition of equilibrium. If, then, an increased load demand is made on the system and the temperature of the thermo bulb 53 is increased an amount equal to produce an increase of five pounds per square inch pressure in the chamber 29, this additional force will then be transmitted through the various mechanisms to the valve stem 19 which will be moved to open the valve and increase the pressure on the downstream side thereof. If it be assumed that the effective area of the bellows 36 and that of the diaphragm are in a ratio of five to one, then, when the pressure in the chamber 37 reaches an increased value of one pound per square inch, the stabilizer will be operative to overcome the force due to the increased temperature and will tend to close the valve. Thus, while the thermo valve has called for an increase of five pounds per square inch in the evaporator 56, an increase in pressure therein of only one pound per square inch is permitted. Throughout this cycle of operation, however, the one pound per square inch increase in pressure in the system is slowly bleeding through the restriction 52 into the pressure chamber 38 on top of the bellows 36 and is gradually building up a pressure in the chamber which tends to exert a downward force on the valve stem 19 to cause the valve to open and admit more of the pressure medium. This cycle of operation will continue until a sufficient amount of the pressure-exerting medium has been allowed to pass into the system 56 to bring it to a state of equilibrium. For example, this point may be reached when a pressure of 22 pounds per square inch is active in the chamber 29 and a pressure of twelve pounds per square inch in the chamber 30.

It is obvious, since the effective area of the bellows is greater than that of the diaphragm 28, that the valve operates initially with a less sensitive valve reaction than is eventually accomplished by it when the pressure equalizes across the bellows 36. When this point is reached, the sensitivity of the valve is controlled by the diaphragm 28 and the adjustment of the valve spring 20, and the valve is capable of operating with a sensitivity equivalent to that of a standard thermo valve.

With particular reference to refrigerating installations, it is possible to use a valve embodying the instant invention in a manner such that the restrictive element 52 in the form of a needle valve may be "turned in" to the rate of response of the stabilizing element 13 to meet the individual conditions required. This will enable an arrangement of the apparatus which will provide a valve sensitivity capable of maintaining a given superheat in the refrigerating system regardless of the load condition to which it is subjected, and this without excessive cycling as would result with a standard thermo valve.

As many modifications of the changes could be made over the form illustrated and without departing from the scope of the invention, it is intended that the representations and descriptions herein made are to be considered as illustrative only and not in a limiting sense.

What is claimed is:

1. In an apparatus for retarding response of a diaphragm-operated valve to changes in actuating pressures upon one side of the diaphragm without changing the ultimate response of the valve to the new actuating pressures: a valve body having an inlet and an outlet and a valve to regulate flow therebetween; a first diaphragm having first and second pressure chambers on its opposite sides; a second diaphragm having one side exposed to the aforesaid second pressure chamber pressures so as to be acted upon by subtantially the same pressures as those acting upon the first diaphragm, and having a third pressure chamber on its opposite side; a connection between the second and third chambers, with a throttling device therein, a connection between the outlet side of the valve, the third chamber, and the throttling device to conduct pressures from the outlet side of the valve to the third chamber rapidly and to the second chamber restrictedly, means connecting the two diaphragms and the valve to cause the valve to follow movements of the two diaphragms, the second diaphragm being of different effective area than the first.

2. The mechanism of claim 1 wherein the second diaphragm is larger than the first.

CLIFFORD B. IVES.

REFERENCES CITED

The following references are of record in the file of this patent:

UNITED STATES PATENTS

| Number | Name | Date |
|---|---|---|
| 554,398 | Powers | Feb. 11, 1896 |
| 1,821,812 | Marbury | Sept. 1, 1931 |
| 1,971,801 | Wantz | Aug. 28, 1934 |
| 2,005,773 | De Florez | June 25, 1935 |
| 2,019,724 | Otto | Nov. 5, 1935 |
| 2,071,871 | Cleveland | Feb. 23, 1937 |
| 2,085,942 | Bancel | July 6, 1937 |
| 2,098,914 | Gorrie | Nov. 9, 1937 |
| 2,141,082 | Dickey | Dec. 20, 1938 |
| 2,202,485 | Fitch | May 28, 1940 |
| 2,227,760 | Newcum | Jan. 7, 1941 |
| 2,409,871 | Krogh | Oct. 22, 1946 |
| 2,441,405 | Fitch | May 11, 1948 |

FOREIGN PATENTS

| Number | Country | Date |
|---|---|---|
| 437,231 | Great Britain | Oct. 25, 1935 |

OTHER REFERENCES

Keppler, pages 61 and 62 of the Transactions of the American Society of Mechanical Engineers, volume 58 (1936).